United States Patent
Venkatesh et al.

(10) Patent No.: US 8,732,401 B2
(45) Date of Patent: May 20, 2014

(54) METHOD AND APPARATUS FOR CACHE REPLACEMENT USING A CATALOG

(75) Inventors: Chetan Venkatesh, San Mateo, CA (US); Sagar Shyam Dixit, Sunnyvale, CA (US)

(73) Assignee: Atlantis Computing, Inc., Mountain View, CA (US)

( * ) Notice: Subject to any disclaimer, the term of this patent is extended or adjusted under 35 U.S.C. 154(b) by 85 days.

(21) Appl. No.: 13/269,503

(22) Filed: Oct. 7, 2011

(65) Prior Publication Data

US 2013/0013844 A1  Jan. 10, 2013

Related U.S. Application Data

(60) Provisional application No. 61/505,524, filed on Jul. 7, 2011.

(51) Int. Cl.
G06F 12/12 (2006.01)

(52) U.S. Cl.
USPC ........................................... 711/133; 711/144

(58) Field of Classification Search
USPC ................................................. 711/133, 144
See application file for complete search history.

(56) References Cited

U.S. PATENT DOCUMENTS

| | | | |
|---|---|---|---|
| 4,603,380 A | 7/1986 | Easton et al. | |
| 6,807,619 B1 * | 10/2004 | Ezra et al. | 711/219 |
| 7,356,651 B2 * | 4/2008 | Liu et al. | 711/144 |
| 8,117,464 B1 | 2/2012 | Kogelnik | |
| 8,495,288 B2 | 7/2013 | Hosoya et al. | |
| 2004/0128470 A1 | 7/2004 | Hetzler et al. | |
| 2005/0038850 A1 | 2/2005 | Oe et al. | |
| 2005/0131900 A1 | 6/2005 | Palliyll et al. | |
| 2007/0005935 A1 | 1/2007 | Khosravi et al. | |
| 2007/0266037 A1 | 11/2007 | Terry et al. | |
| 2008/0183986 A1 | 7/2008 | Yehia et al. | |
| 2009/0089337 A1 | 4/2009 | Perlin et al. | |
| 2009/0254507 A1 | 10/2009 | Hosoya et al. | |
| 2009/0319772 A1 | 12/2009 | Singh et al. | |
| 2010/0188273 A1 | 7/2010 | He et al. | |
| 2010/0306444 A1 | 12/2010 | Shirley et al. | |
| 2011/0055471 A1 | 3/2011 | Thatcher et al. | |
| 2011/0071989 A1 | 3/2011 | Wilson et al. | |
| 2011/0196900 A1 | 8/2011 | Drobychev et al. | |
| 2011/0276781 A1 | 11/2011 | Sengupta et al. | |
| 2012/0016845 A1 | 1/2012 | Bates | |
| 2012/0054445 A1 * | 3/2012 | Swart et al. | 711/133 |
| 2012/0137054 A1 | 5/2012 | Sadri et al. | |
| 2013/0124523 A1 | 5/2013 | Rogers et al. | |
| 2013/0166831 A1 * | 6/2013 | Atkisson et al. | 711/103 |
| 2013/0238876 A1 | 9/2013 | Fiske et al. | |
| 2013/0282627 A1 | 10/2013 | Faddoul et al. | |

\* cited by examiner

*Primary Examiner* — John Lane
(74) *Attorney, Agent, or Firm* — Blakely, Sokoloff, Taylor & Zafman LLP

(57) ABSTRACT

Methods and systems to intelligently cache content in a virtualization environment using virtualization software such as VMWare ESX or Citrix XenServer or Microsoft HyperV or Redhat KVM or their variants are disclosed. Storage IO operations (reads from and writes to disk) are analyzed (or characterized) for their overall value and pinned to cache if their value exceeds a certain defined threshold based on criteria specific to the New Technology File System (NTFS) file-system. Analysis/characterization of NTFS file systems for intelligent dynamic caching include analyzing storage block data associated with a Virtual Machine of interest in accordance with a pre-determined data model to determine the value of the block under analysis for long term or short term caching. Integer values assigned to different types of NTFS objects in a white list data structure called a catalog that can be used to analyze the storage block data.

12 Claims, 11 Drawing Sheets

150

| Value (Integer) | Types of Windows/NTFS Objects |
|---|---|
| 1 | e.g., HAL Components, SAM Registry, Security, NTUesr.dat |
| 3 | e.g., Boot Components, DEFAULT Registry, SYSTEM Registry, NTOSKRNL and related components, win32/64 DLLs, c:\windows\*, prog_files\microsoft, prog_files\office |
| 2 | e.g., Anything not having a Value of 1 or a Value of 3 |
| 0 | e.g., All non windows NTFS objects such as Application and User Data |

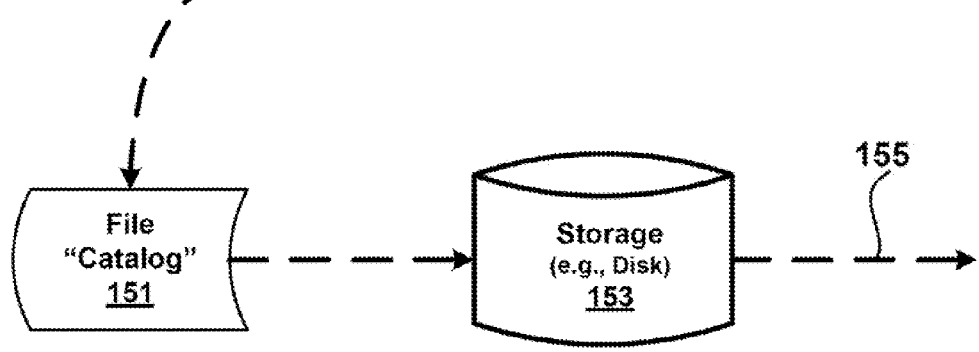

File "Catalog" 151 → Storage (e.g., Disk) 153 → 155

FIG. 1B

METHOD AND APPARATUS FOR CACHE REPLACEMENT USING A CATALOG

CROSS-REFERENCE TO RELATED APPLICATIONS

This application is related to U.S. Provisional Patent Application No. 61/505,524, filed Jul. 7, 2011, and entitled "De-Duplication Of Virtual Machine Files In A Virtualized Desktop Environment," which is herein incorporated by reference in its entirety and for all purposes.

FIELD OF THE INVENTION

The invention relates generally to storage data caching of Virtual Machine Images/disks that execute on a virtual machine hypervisor (virtualization layer). More specifically the invention relates to a way of determining which storage blocks have a higher value to be cached or retained in a high speed cache for a longer period of time and which storage blocks should be discarded or cached/retained for shorter intervals of time because of those blocks have lower value.

BACKGROUND OF THE INVENTION

Conventional solutions for virtualization technology provide numerous capabilities to efficiently deliver applications and desktops by packaging them as virtual machines. Virtualization is a technology that provides a software based abstraction to a physical hardware based computer. The abstraction layer decouples the physical hardware components—CPU, memory, and disk from the Operating System (OS) and thus allows many instances of an OS to be run side-by-side as virtual machines (VMs) in complete isolation to one another. The OS within each virtual machine sees a complete, consistent and normalized set of hardware regardless of the actual physical hardware underneath the software based abstraction. Virtual machines are encapsulated as files (also referred to as images) making it possible to save, replay, edit, copy, cut, and paste the virtual machine like any other file on a file-system. This ability is fundamental to enabling better manageability and more flexible and quick administration compared to physical virtual machines.

These benefits notwithstanding, conventional VMs suffer from several performance related weaknesses that arise out of the way the VM interfaces with the storage sub-system(s) that stores the VM images or files. Those performance weaknesses include but are not limited to the following examples.

First, every read operation or write operation performed by every single VM (and there can be hundreds if not thousands of VMs performing such operations concurrently) is serviced in a queue by the storage system. This creates a single point of contention that results in below-par performance.

Second, the storage system usually blocks all write operations until a read request is fulfilled. Therefore, the preference given to read IO's results in data that flows in fits and bursts as the storage system comes under load. In more advanced storage architectures, storage pools are created to isolate applications from being blocked by each other but the effect is still experienced within the pool.

Third, there are numerous latencies that develop as input/output (IO) is queued at various points in an IO stack from a VM hypervisor to the storage system. Examples of latencies include but are not limited to: (a) when an application residing inside a Guest OS issues an IO, that IO gets queued to the Guest OS's Virtual Adapter driver; (b) the Virtual Adapter driver then passes the IO to a LSI Logic/BusLogic emulator; (c) the LSI Logic/Bus Logic emulator queues the IO to a VMkernel's Virtual SCSI layer, and depending on the configuration, IOs are passed directly to the SCSI layer or are passed thru a Virtual Machine File System (VMFS) file system before the IO gets to the SCSI layer; (d) regardless of the path followed in (c), ultimately all IOs will end up at the SCSI layer; and (e) IOs are then sent to a Host Bus Adapter driver queue. From then on, IOs hit a disk array write cache and finally a back-end disk. Each example in (a)-(e) above introduces various degrees of latency.

Fourth, Least Recently Used (LRU)/Least Frequently Used (LFU)/Adaptive Replacement (ARC) cache replacement techniques all ultimately rely on building a frequency histogram of block storage access to determine a value for keeping or replacing a block from cache memory. Therefore, storage systems that rely on these cache management techniques will not be effective when servicing virtualization workloads especially Desktop VMs as the working set is too diverse for these techniques to manage cache consolidation and not cause cache fragmentation.

Fifth, in a virtualization environment, there typically exist multiple hierarchical caches in different subsystems—i.e. the Guest OS, the VM Hypervisor and a Storage Area Network (SAN)/Network Attached Storage (NAS) storage layer. As all the caches are independent of each other and unaware of each other, each cache implements the same cache replacement policies (e.g., algorithms) and thus end up all caching the same data within each independent cache. This results in an inefficient usage of the cache as cache capacity is lost to storing the same block multiple times. This is referred to as the cache inclusiveness problem and cannot be overcome without the use of external mechanisms to co-ordinate the contents of the multiple hierarchical caches in different subsystems.

Finally, SAN/NAS based storage systems that are under load ultimately will always be at a disadvantage to service virtualization workloads as they will need to service every IO operation from disk as cache will be overwhelmed and fragment in the face of a large working set and because of diminished capacity within the caches due to the aforementioned cache inclusiveness problem.

The above performance weakness examples are a non-exhaustive list and there are other performance weaknesses in conventional virtualization technology.

There are continuing efforts to improve processes, cache techniques, software, data structures, hardware, and systems for virtualization technology.

BRIEF DESCRIPTION OF THE DRAWINGS

Various embodiments of the invention are disclosed in the following detailed description and the accompanying drawings:

FIG. 1B depicts another example of a white list data structure for a catalog for Windows/NTFS object types, according to various embodiments;

Figure 1A:
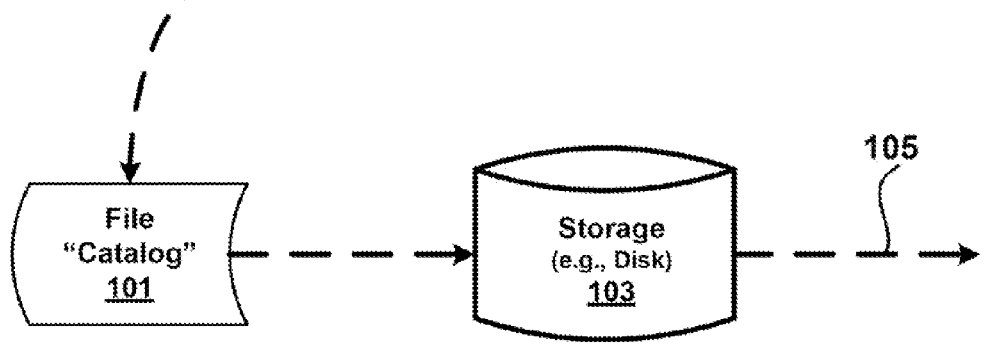
FIG. 1A depicts one example of a white list data structure for a catalog for NTFS object types, according to various embodiments.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, then the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Software and/or firmware implementations may be embodied in a non-transitory computer readable medium configured for execution by a general purpose computing system or the like. The described techniques may be varied and are not limited to the examples or descriptions provided.

The present invention overcomes all of the limitations of the aforementioned conventional solutions for virtualization technology by providing a content aware caching implementation having one or more of the following benefits.

Every block IO request is characterized or analyzed to understand its importance relative to other components within the Virtual Machines file system. Characterization of block IO requests allows the cache to maintain a higher quality of content in the face of numerous IO requests from virtual machines that would fragment a non content aware cache.

The characterization allows a score to be assigned to the requested block and use of the assigned score to evaluate the importance of the block in the event of a cache slot/replacement scenario. Consequently, cached blocks that are of higher importance in the NTFS file system are more resistant to replacement and take precedence in the cache.

The cache inclusivity problem is also solved, wherein when multiple hierarchical caches are working independently (as would be the case in a typical virtualization scenario) all the different caches (though hierarchical) end up including more or less the same blocks and thus are not affective. Due to the content awareness of the application, the cache is able to store a more diverse set of blocks than typical cache replacement mechanisms such as Least Recently Used (LRU) or Least Frequently Used (LFU).

The cache is near line to the VMs thus allowing most IO requests to be serviced by the caching application rather than the SAN/NAS system and thus offloading the SAN/NAS from contention allowing for performance and response time benefits.

Embodiments of the present invention pertain to the methods and systems to increase cache efficacy and to an alternative caching scheme that fronts the SAN/NAS storage subsystem. In one embodiment, a data reduction technique such as data de-duplication to only store unique data within the cache. This embodiment relates to the write IO generated by the virtual machines to the storage system. De-duplication techniques are described in U.S. Patent Application No. 61/505,524 filed on Jul. 7, 2011, and titled "De-Duplication Of Virtual Machine Files In A Virtualized Desktop Environment", already incorporated herein by reference.

In another embodiment, heuristics are used to characterize and determine the value of seeking a block from storage and how long to retain the block and/or when to evict/replace the block from the cache in favor of a block with a higher value. This embodiment relates to the read IO generated by the desktop Virtual Machines as they seek data from storage during discrete phases of their life-cycle including but not limited to boot, user logon, application launch, anti-virus scan etc.

A third embodiment of the invention is as an inline virtual storage appliance that services its requests while running adjacent to the Desktop Virtual Machine workloads that its servicing and its ability to service IO requests more effectively from the cache (better locality of reference) closer to the demand and eliminating the need for SAN/NAS to service those requests.

The various embodiments of the present invention use a white list data structure called a catalog. The catalog contains a list of hashes of known NTFS objects. Each hash entry in the catalog is of a size corresponding to the NTFS cluster size. For example, each block can have a size of 4 KB. The contents of the catalog are pre-determined and contain the hashes of the most frequently used blocks common to Virtual Machines in a Virtualized Desktop environment running the Windows operating system. Corresponding to each hash entry in the catalog is a value field that contains an integer value. For example, the integer values can be between 1 and 3, where 1 is the lowest value and 3 is the highest value. Actual ranges for integer values will be application dependent and other integer values may be implemented and the present invention is not limited to the integer values described herein.

FIG. 1A depicts an exemplary white list data structure for a catalog 100 where hash entries for types of NTFS objects are depicted in a right hand column of the data structure for catalog 100 and integer values assigned to blocks are depicted in a left hand column of the data structure for catalog 100. Values depicted in the left hand column are assigned to the various blocks in the catalog 100 based on the following criteria. A value of 1 marks a block in the right hand column that is never to be cached, meaning that the block is read from storage (e.g., disk) but is never populated in the cache. A value of 2 marks a block in the right hand column that is to be cached and replaced normally according to a default replacement algorithm. A value of 3 marks a block in the right hand column that is to be pinned to the cache and never replaced. Optionally, a value of 0 marks a block in the right hand column that like the value 1 is never to be cached. The above criteria is only one example and the present invention is not limited to the criteria described herein and other schemes may be used to assign values to blocks in the catalog and to determine what actions to take based on the assigned values.

The catalog 100 is stored in a file 101 on disk 103 or other data storage media and is a part of the caching application. Examples of storage media include but are not limited to a hard disk drive (HDD), a solid state disk drive (SSD), a RAID storage system, just to name a few. The file 101 can subsequently be read 105 from the disk 103 by an application running on a hypervisor (not shown). Components in the catalog 100 may be hashed using a weak hash, such as a CRC, for example. A CRC based hashing technique is economical from a CPU resource stand point and the CPU can execute the CRC hash quickly. Further, should two entries share a hash, there would be no material side-effect other than one of the two entries being kept in cache while the other entry would have to be fetched from disk or other data storage media.

FIG. 1B depicts another example of an exemplary white list data structure for a catalog 150 where hash entries for types of Windows/NTFS objects. Catalog 150 is stored in a file 151 on disk 153 or other data storage media and is a part of the caching application. The file 151 can subsequently be read 155 from the disk 153 by an application running on a hypervisor (not shown). Values depicted in the left hand column can be assigned to the various blocks in the catalog 150 based on the criteria described above in reference to catalog 100 of FIG. 1A.

Catalog Preparation

The hash-table data structure for catalog 100 can be populated in the following order: (1) a Virtual Machine image with the windows operating system is created, either from scratch or an existing image is used; (2) a Virtual Machine image is loaded by the Application via means of a mount utility; (3) the Application enumerates the file contents of the operating system and program files directories on the root file-system and stores this enumeration (denoted as a directory enumeration result); (4) each file in the directory enumeration result is then read from disk or other data storage media, the file is read sequentially from beginning to end in segments determined by the NTFS cluster size (e.g., in 4 KB segments); (5) each segment upon read is hashed using a hash function (e.g., such as a CRC-32 function) and the generated hash is then stored as an entry in the catalog 100 along with its associated content value (see FIGS. 1A and 1B) such as set forth in the non-limiting examples of (a)-(c) below for Windows/NTFS Objects:

(a) HAL components, SAM Registry, Security, NTUser.dat from system32/64 directories are assigned a value of 1;
(b) Boot Components, DEFAULT Registry, SYSTEM Registry, NTOSKRNL and related components, win32/64 DLLs, c:\windows\*, prog_files\microsoft, prog_files\office are assigned a value of 3; (c) All remaining content is assigned a value of 2. The file for catalog 100 is an intrinsic part of the Application and is stored along with the Application. Once all the files are processed, the file for catalog 100 is closed and saved to disk or other data storage media.

Figure 2:
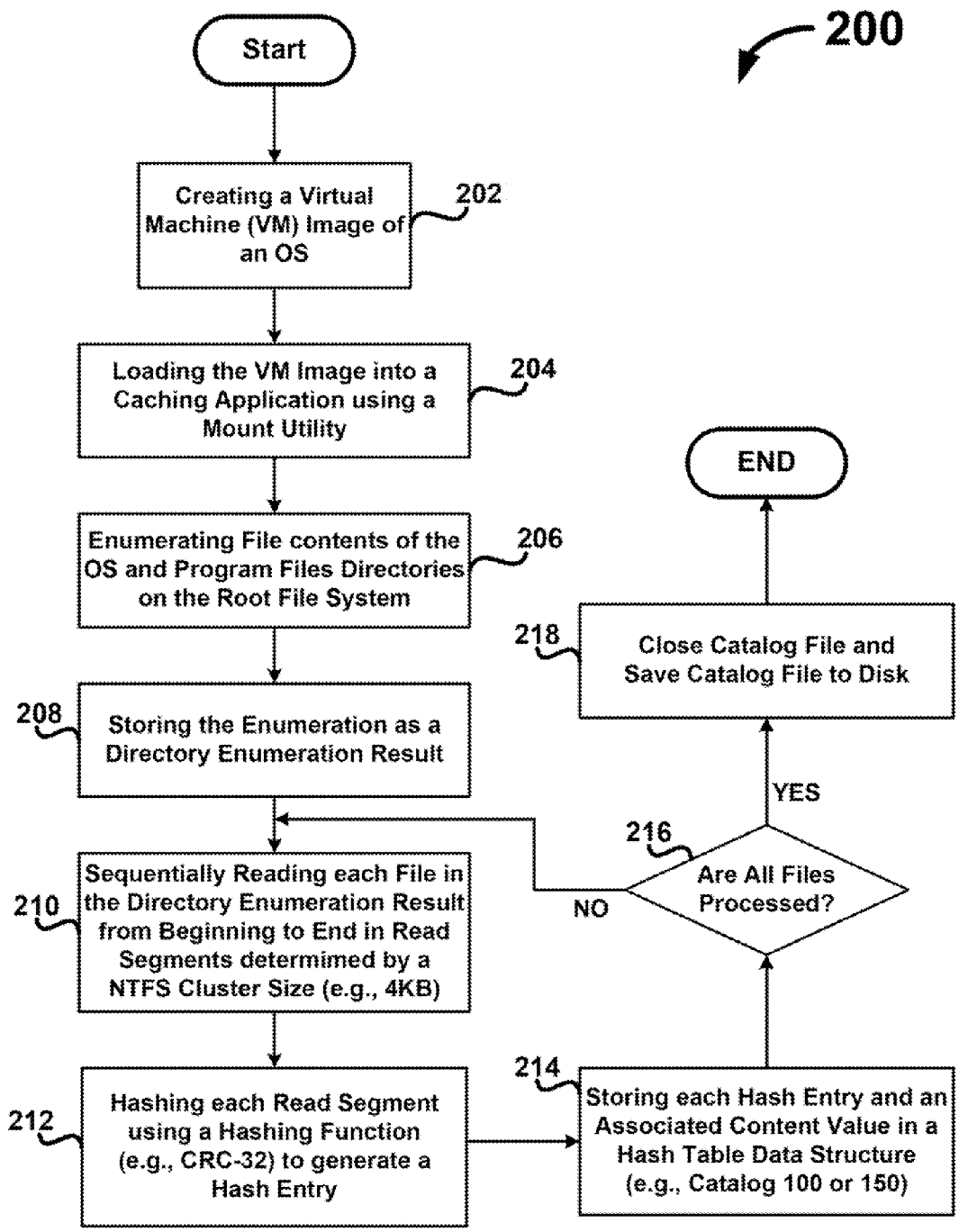
FIG. 2 depicts one example of a process for preparing a catalog, according to various embodiments.

Turning now to FIG. 2, a process 200 depicts one example of catalog preparation. At a stage 202 a Virtual Machine (VM) image with an OS is created from an existing image or from scratch. At a stage 204 the VM image is loaded into a caching application (Application hereinafter) using a mount utility. At a stage 206 the Application enumerates file contents of the OS and program files directories on the root file system. At a stage 208 the Application stores the enumeration as a directory enumeration result. At a stage 210 each file in the directory enumeration result is sequentially read from beginning to end in segments that are determined by a NTFS cluster size (e.g., 4 KB). The directory enumeration result is sequentially read from a disk or other storage media. At a stage 212 each segment that was read is hashed using a hashing function such as CRC-32 or some other hashing function, such as a weak hashing function. Preferably, the hashing function is a weak hashing function or some other type of hashing function that is not compute time intensive so as to not create latency due to unnecessarily long compute times to implement the hashing function. At a stage 214 each hash entry and a value associated with the hash entry are stored in hash table data structure such as the catalog 100 of FIG. 1. At a stage 216 a decision branch make a query as to whether or not all of the files from the directory enumeration result have been read. If all of the files have not been read, then a "NO" branch is taken and the flow returns to the stage 210 where the sequential reading resumes. If all files have been read, then a "YES" branch is taken and at a stage 218 the file for catalog 100 is closed and saved to disk or other storage media.

Catalog Activation on a Newly Initialized Cache

When the Application is initialized, the file for catalog 100 is read into memory. Once the catalog 100 is populated into memory, the Application waits to service Block Read and Block Write requests and is activated as Block Read requests are serviced from disk or other storage media and the cache is populated. At the beginning when the cache is first initialized, the cache is empty and does not contain any data in its slots. The cache is populated by read and write activity through the cache. Every read or write populates one of the many slots of the cache with its payload. As the cache gets populated, the cache metadata is updated with the value (e.g., 100 or 150) of each slot as described below for populating the cache with Read Requests and Write Requests.

Figure 3:
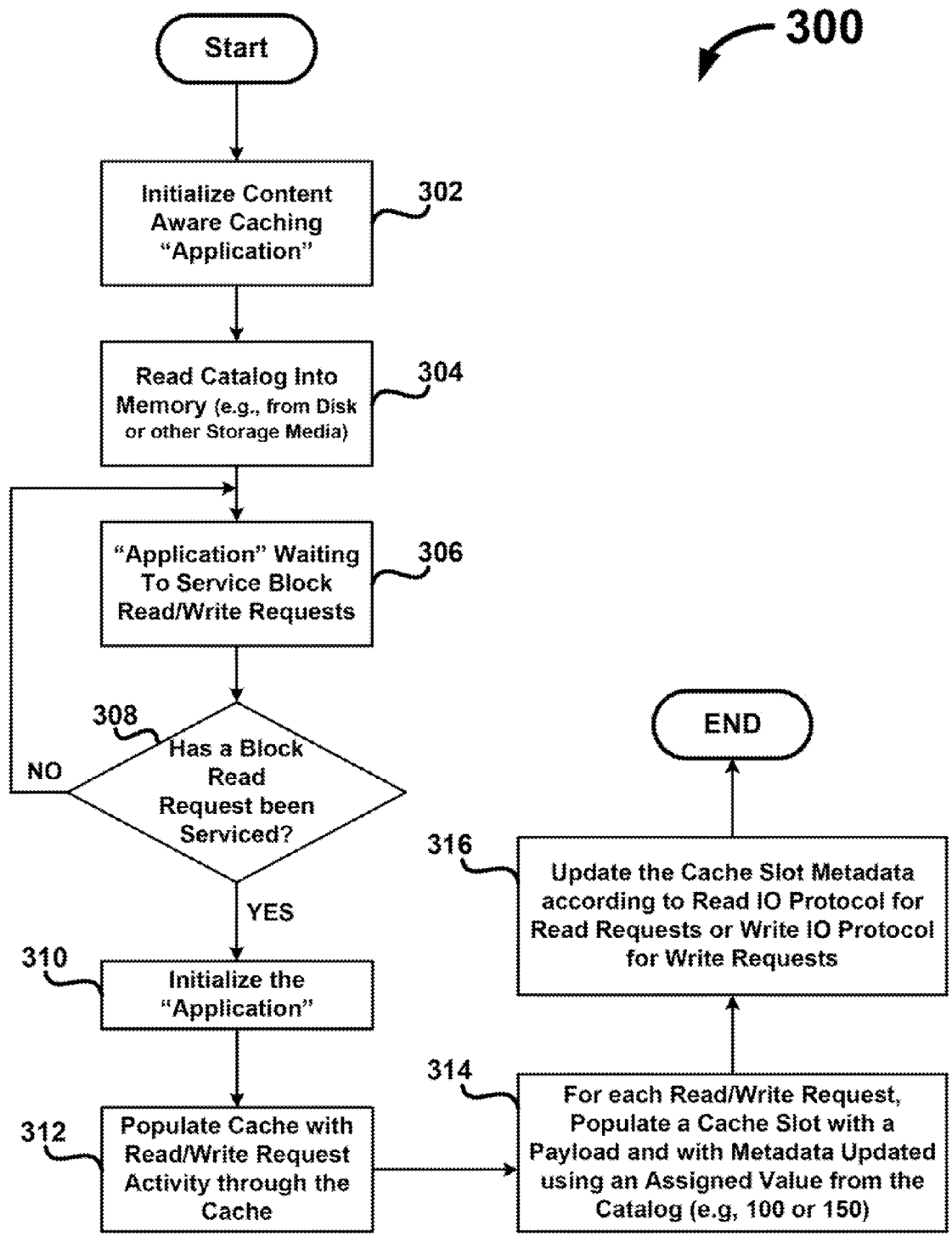
FIG. 3 depicts one example of a process for catalog activation on a newly initialized cache, according to various embodiments.

FIG. 3 depicts one example of a process flow 300 for catalog activation on a newly initialized cache. At a stage 302 a content aware caching application "Application" is initialized. At a stage 304, a catalog (e.g., 100 or 150) is read into memory (e.g., memory used by the Application) from disk or other storage media. At a stage 306, the Application is waiting to service block read and block write requests. At a stage 308 if a block read request has not been serviced, then a NO branch is taken and the flow returns to the stage 306 and the Application continues waiting to service block read and block write requests. However, if a block read request has been serviced, then a YES branch is taken and the Application is initialized at a stage 310. At a stage 312 a cache is populated with read/write requests through the cache. At a stage 314, each read/write request populates a slot in the cache with a payload and metadata. The metadata has been updated with an assigned value from the catalog (e.g., 100 or 150). At a stage 316, cache slot metadata is updated according to read IO protocols for read requests or according to write IO protocols for write requests.

Read Requests and Cache Population

Every first read results in a cache miss as the cache cannot service the block IO read and fetches it from disk or other storage media. As the read is serviced from disk or other storage media, the catalog value of the read IO request is computed as follows: (a) the content of the block is hashed using a hash function (e.g., CRC-32) and the resulting hash value is stored in memory; and (b) the hash value is compared against the catalog 100 and a catalog value is assigned to the read IO. If the hash value exists in the catalog 100, then the corresponding catalog value is assigned to the read IO and stored in the cache slot's metadata. If the catalog value of the hash is 1, then the value is not populated in the cache. If the hash value does not exist in the catalog, then the value of 0 (zero) is assigned to the read IO and stored in the cache metadata.

Figure 4:
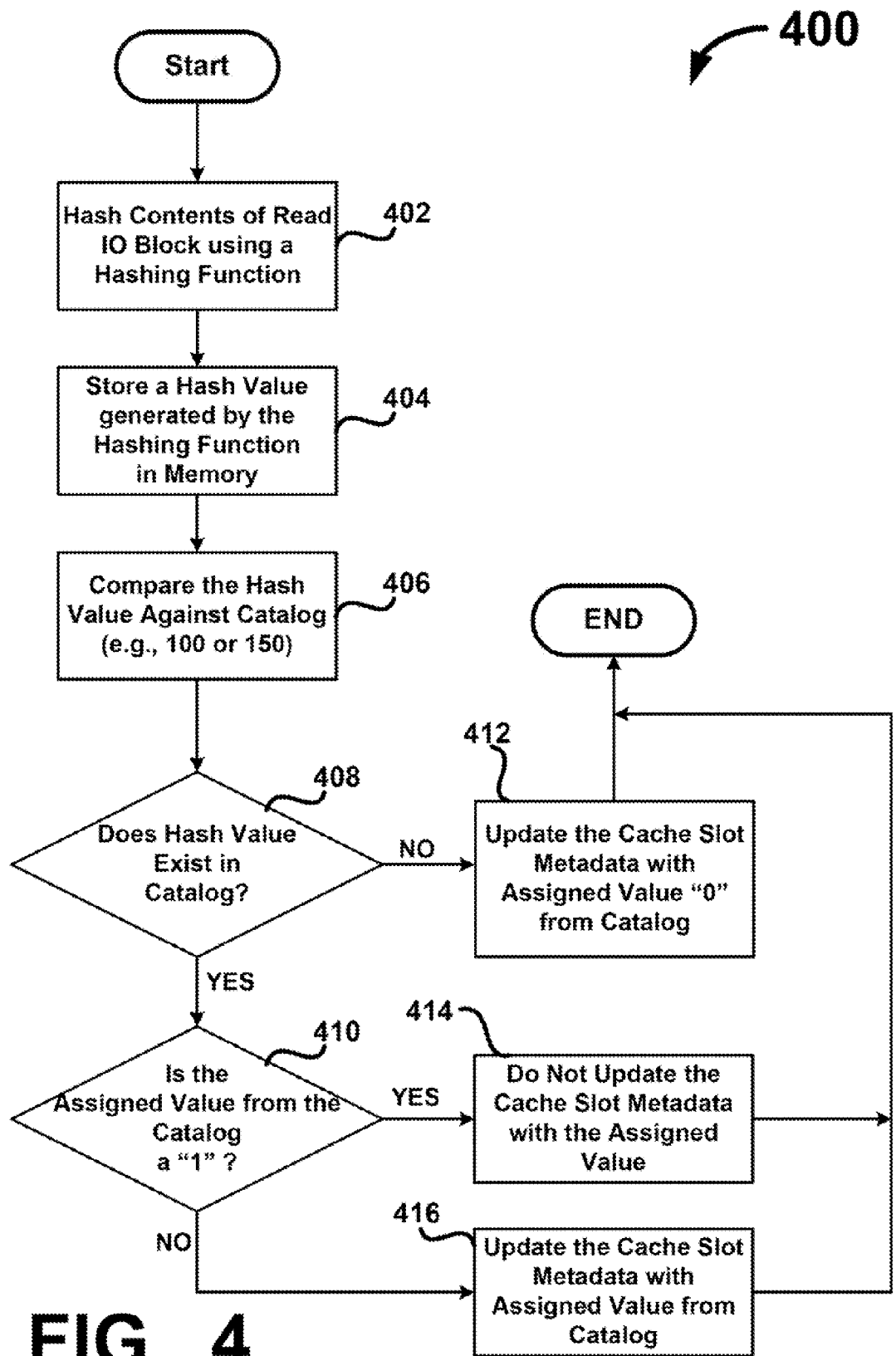
FIG. 4 depicts one example of a process for read request cache population, according to various embodiments.

Referring now to FIG. 4, a process 400 depicts one example of read request cache population. At a stage 402 a hashing function (e.g., CRC-32) is used to hash the contents of a read IO block. At a stage 404 a hash value generated by the hashing function is stored in memory. At a stage 406 the hash value is compared against the catalog (e.g., 100 or 150). At a stage 408 a determination is made as to whether or not the hash value exists in the catalog. If not, a NO branch is taken and at a stage 412 the metadata for the cache slot is updated with an assigned value of "0" from the catalog. On the other hand, if the hash value exists in the catalog, then a YES branch is taken and at a stage 410 a determination is made as to whether or not the assigned value from the catalog is an assigned value of "1". If the assigned value is "1", then a YES branch is taken and at a stage 414 the cache slot metadata is not updated. If the assigned value is not "1", then a NO branch is taken and at a stage 416 the cache slot metadata is updated with an assigned value from the catalog.

Write Requests and Cache Population

Every write request results in the cache being populated (or eviction and then population) if the cache is in write-back. If the cache is in write-through or a variant write around mode, then the cache is only populated in the subsequent reading of that IO request. In a write back cache when a write IO request is stored in the cache, the catalog value of the write IO request is computed as follows: (a) the content of the block is hashed using a hash function (e.g., CRC-32) and the resulting hash value is stored in memory; and (b) the hash value is compared against the catalog 100 and a catalog value is assigned to the write IO. If the hash value exists in the catalog 100, then the corresponding catalog value is assigned to the write IO and stored in the cache slot's metadata. If the catalog value of the hash is 1, then the value is not populated in the cache. If the hash value does not exist in the catalog 100, then the value of 0 (zero) is assigned to the write IO and stored in the cache metadata.

Figure 5:
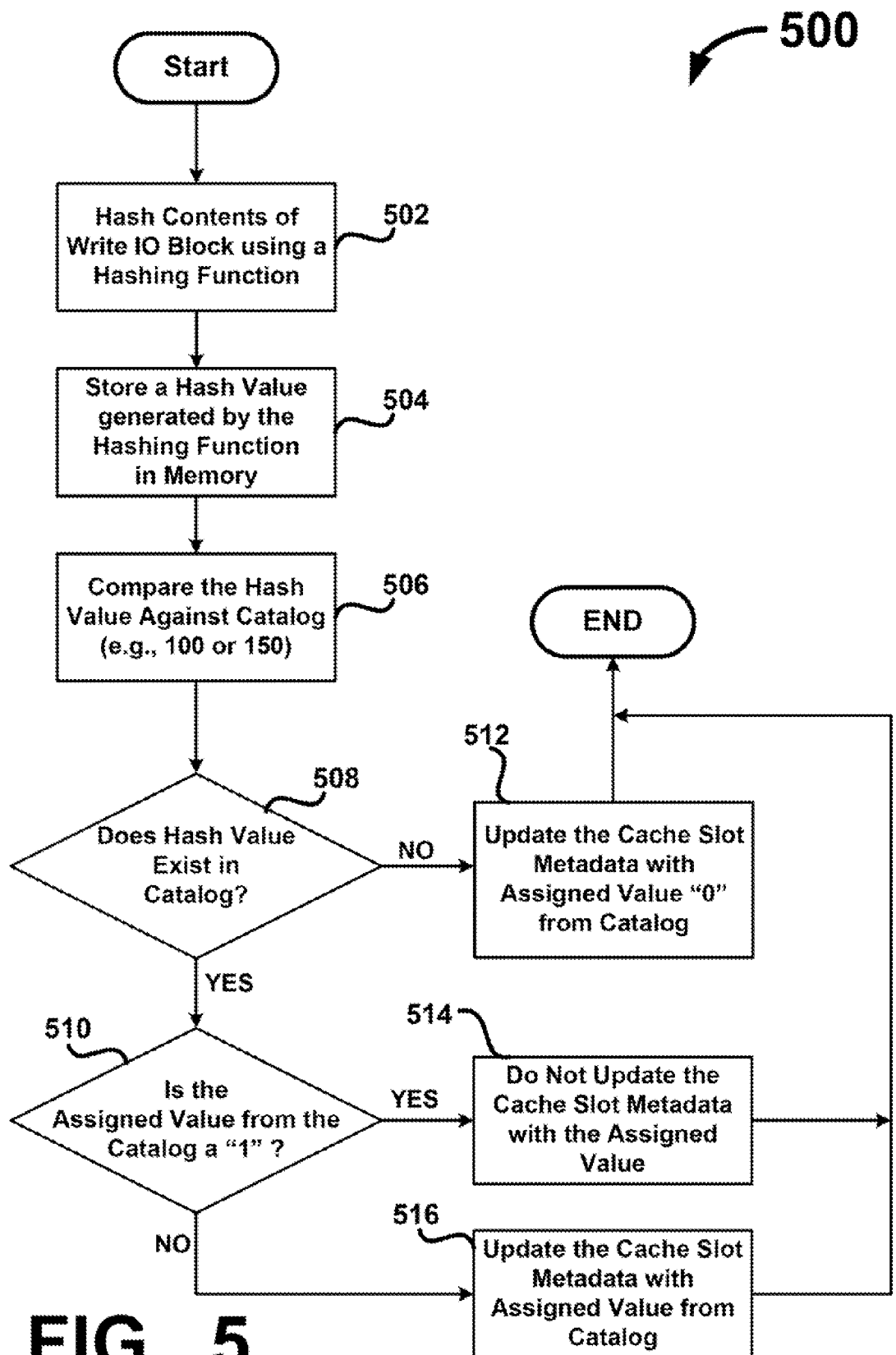
FIG. 5 depicts one example of a process for write request cache population, according to various embodiments.

In FIG. 5, a process 500 depicts one example of write request cache population. At a stage 502 a hashing function is used to hash the contents of a write IO block. At a stage 504 a hash value generated by the hashing function is stored in memory. At a stage 506 the hash value is compared against the catalog (e.g., 100 or 150). At a stage 508 a determination is made as to whether or not the hash value exists in the catalog. If not, a NO branch is taken and at a stage 512 the metadata for the cache slot is updated with an assigned value of "0" from the catalog. On the other hand, if the hash value exists in the catalog, then a YES branch is taken and at a stage 510 a determination is made as to whether or not the assigned value from the catalog is an assigned value of "1". If the assigned value is "1", then a YES branch is taken and at a stage 514 the cache slot metadata is not updated. If the assigned value is not "1", then a NO branch is taken and at a stage 516 the cache slot metadata is updated with an assigned value from the catalog.

Cache Replacement Using the Catalog Value

When the cache is full, the cache must choose which items to discard to make room for the new ones. In the context of the Application at hand, the cache uses the catalog value from catalog (e.g., 100 or 150) to determine if a slot can be evicted from a set in a cache as follows: (a) in a given set, all slots with value of 3 are never evicted. If the catalog value of the slot being examined for eviction has a value of 3, then the slot is left intact and the next slot in the series (or set) is evaluated; (b) in a given set, all slots with catalog value 0 are first evaluated for eviction. Among all slots with catalog value of 0, the slot with the oldest time stamp is evicted or replaced; (c) if there are no slots in the set with a catalog value of 0, then all slots of value 2 in the set are then evaluated and the slot with the oldest time slot is evicted; (d) if there are no slots with catalog value of 0 or 2, then all slots of catalog value 1 are evaluated and the slot with the oldest time slot is evicted; and (e) if there are no evictions available in the given set, then other sets in the cache and their associated slots are examined for eviction using the process of steps (a)-(d) above.

Figure 6:
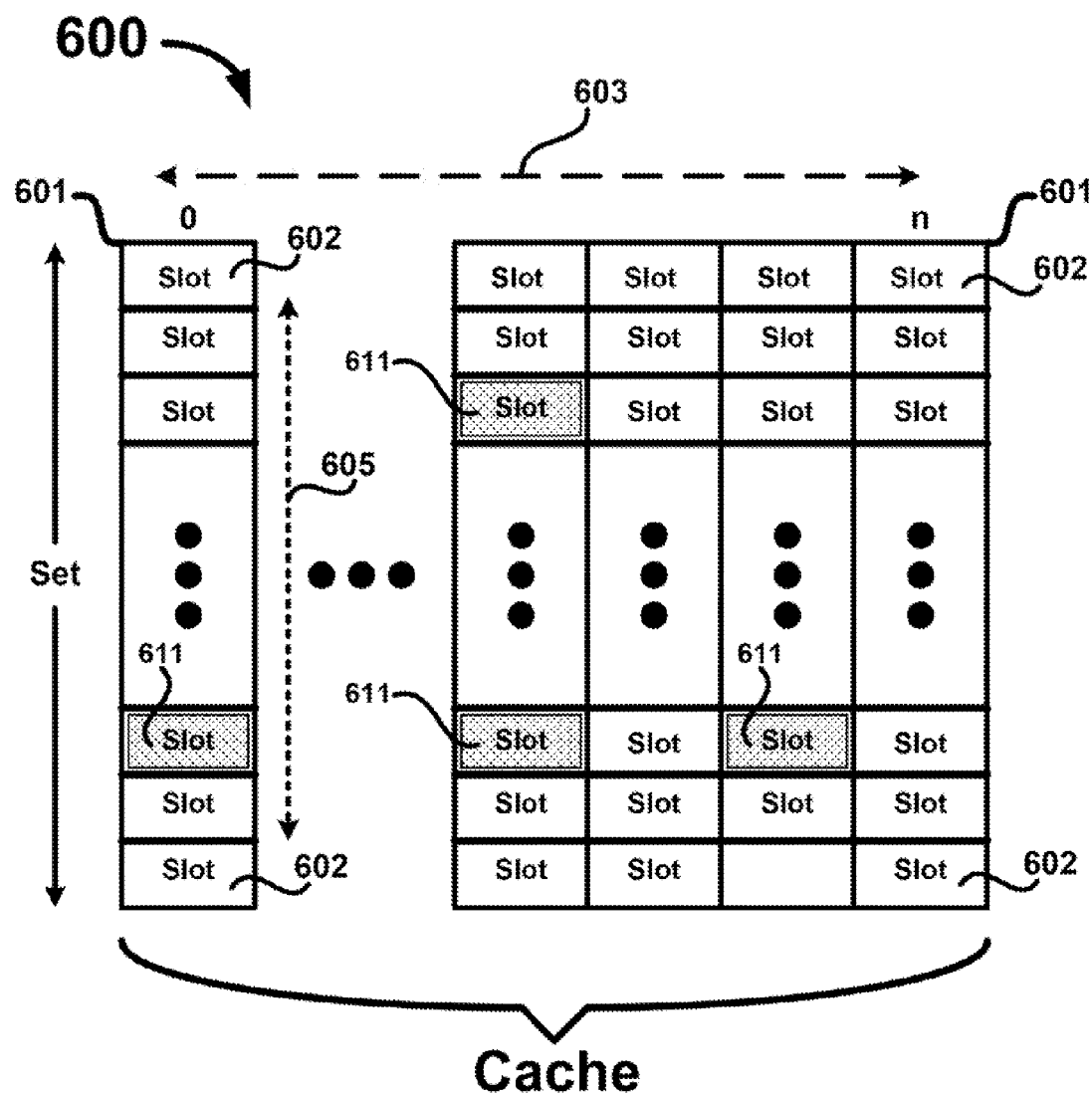
FIG. 6 depicts an example architecture for a cache including a plurality of slots and each slot including a plurality of sets, according to various embodiments.

FIG. 6 depicts one example of an architecture for a cache 600 that includes a plurality of sets 601 with each set 601 including a plurality of slots 602. The Application can use the catalog values from the catalog to parse 603 the sets (in either direction) and to parse 605 the slots 602 within a set 601 (in either direction) to effectuate slot 602 eviction denoted as 611 in FIG. 6 using the above cache replace scheme to evict 611 one or more slots 602 from sets 601 of cache 600.

Figure 7A:
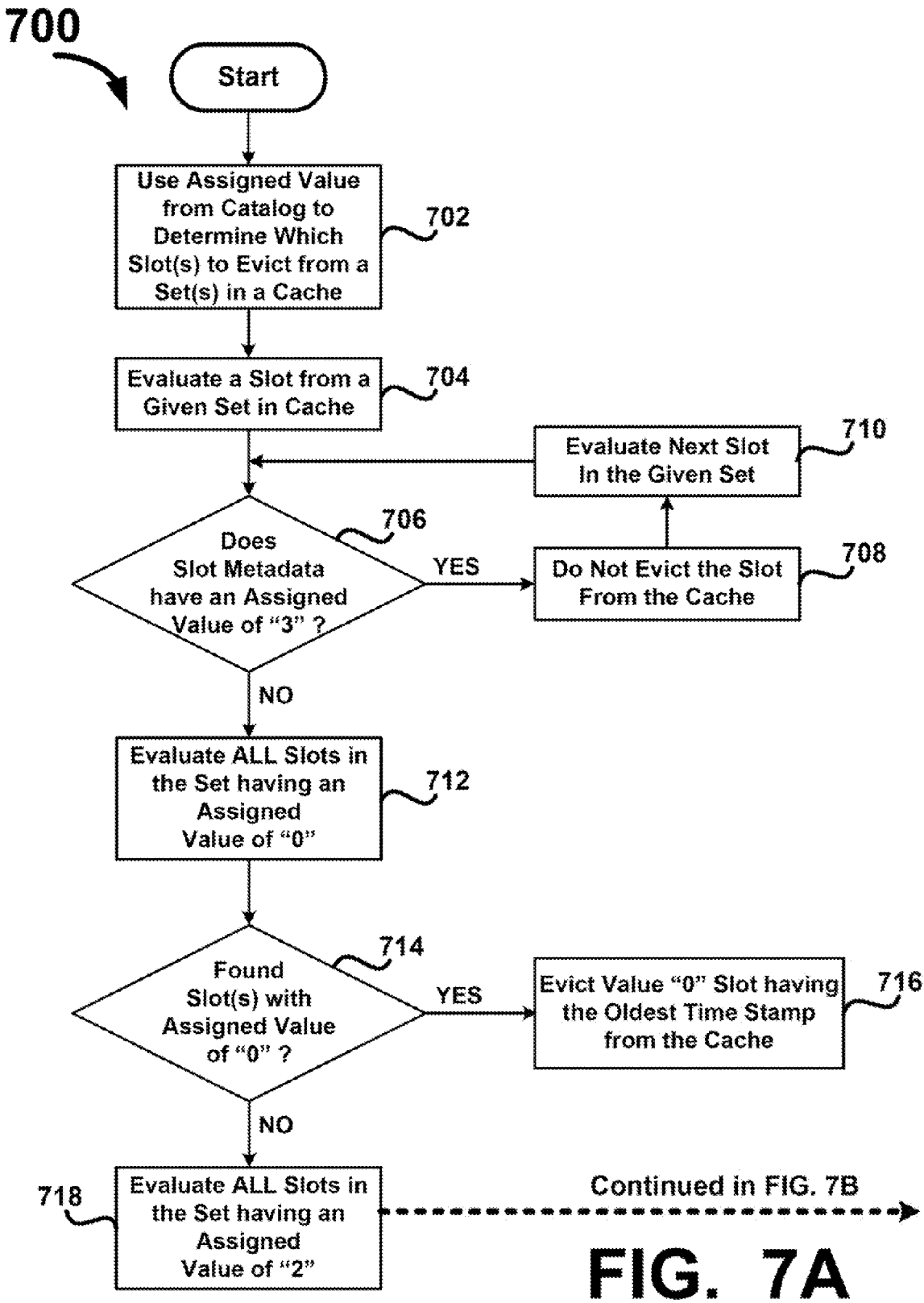
FIGS. 7A-7B depict one example of a process for evaluating assigned values in slot metadata as a basis for slot eviction from a cache, according to various embodiments.
Figure 7B:
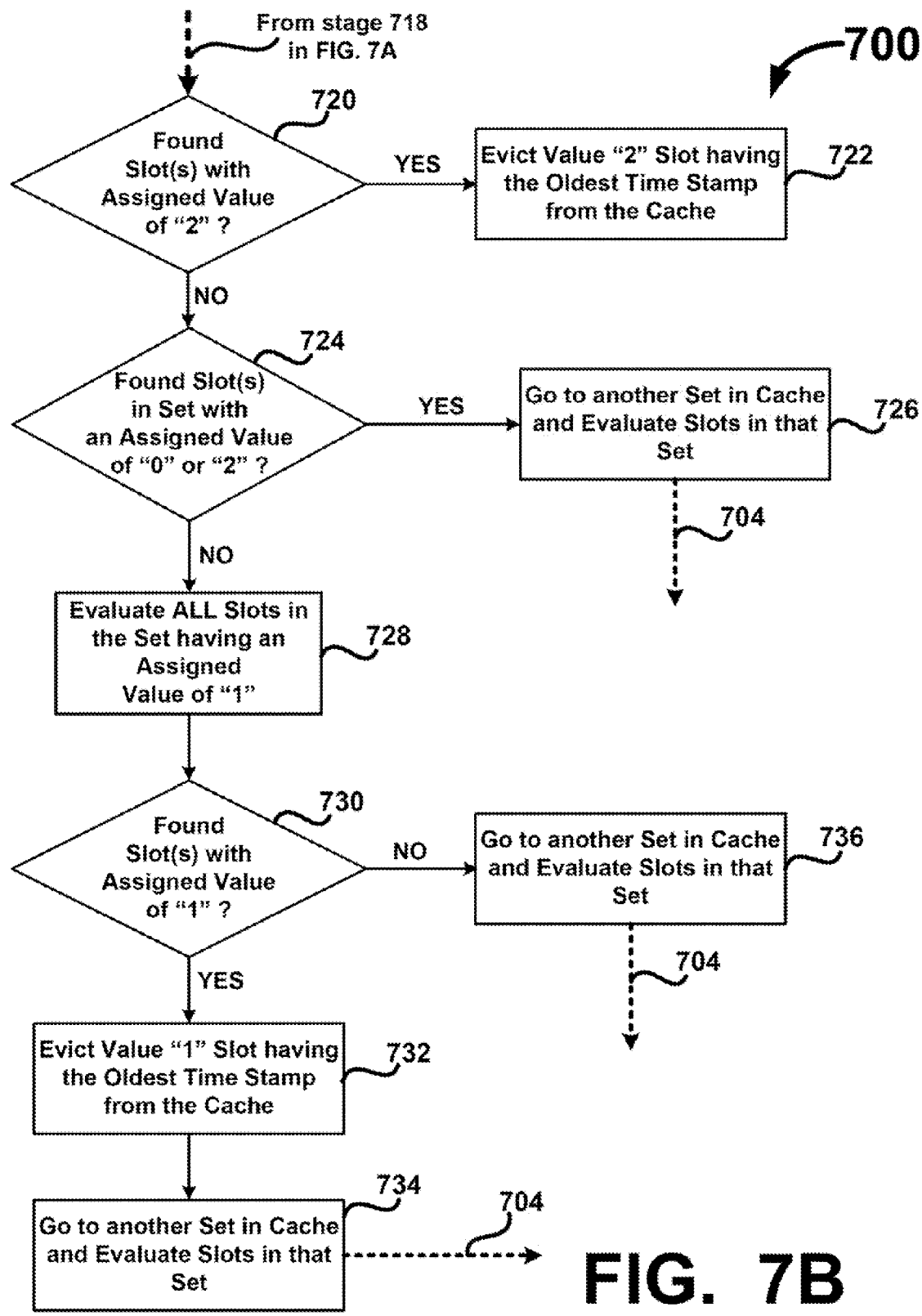

Reference is now made to FIGS. 7A-7B where a process 700 for cache slot replacement using catalog values is depicted. At a stage 702 assigned values from catalog (e.g., 100 or 150) are used to determine which slot or slots to evict from a set in a cache (e.g., cache 600). At stage 704 a slot from a give set in the cache is evaluated. At a stage 706, if the metadata for that slot has an assigned value of "3" from the catalog, then a YES branch is taken and at a stage 708 that slot is not evicted from the cache and at a stage 710 the next slot in the given set may be evaluated and the process can resume at the stage 706. However, if the assigned value is not a "3", then a NO branch is taken and at a stage 712 all slots within the given set are evaluated to determine if they have an assigned value of "0". At a stage 714, if slots having metadata with an assigned value of "0" are found, then a YES branch is taken and at a stage 716 the slot in the given set having the assigned value of "0" and having the oldest time stamp is evicted from the cache. On the other hand, if no slots with an assigned value of "0" are found, then a NO branch is taken and at a stage 718 all slots within the given set are evaluated to determine if they have an assigned value of "2".

Turning now to FIG. 7B, process 700 continues at a stage 720, where if slots having the assigned value of "2" are found a YES branch is taken and at a stage 722 the slot having the assigned value of "2" and having the oldest time stamp is evicted from the cache. If no slots having the assigned value of "2" are found, then a NO branch is taken to a stage 724 where the set is evaluated to see if there are any slots having an assigned value of "0" or "2". If slots having the assigned value of "0" or "2" are found, then a YES branch is taken and at a stage 726 the process 700 can go to another set in the cache and evaluate the slots in that set, for example, by returning to the stage 704 of FIG. 7A. If no slots having the assigned value of "0" or "2" are found, then a NO branch is taken to a stage 728 where all slots in the set having an assigned value of "1" are evaluated. At a stage 730, if slots having the assigned value of "1" are found, then a YES branch is taken and at a stage 732 the slot having the assigned value of "1" and having the oldest time stamp is evicted from the cache. At a stage 734 the process 700 can go to another set in the cache and evaluate the slots in that set, for example, by returning to the stage 704 of FIG. 7A. On the other hand, if no slots with the assigned value of "1" are found, then a NO branch is taken and at a stage 736 the process 700 can go to another set in the cache and evaluate the slots in that set, for example, by returning to the stage 704 of FIG. 7A.

Figure 8:
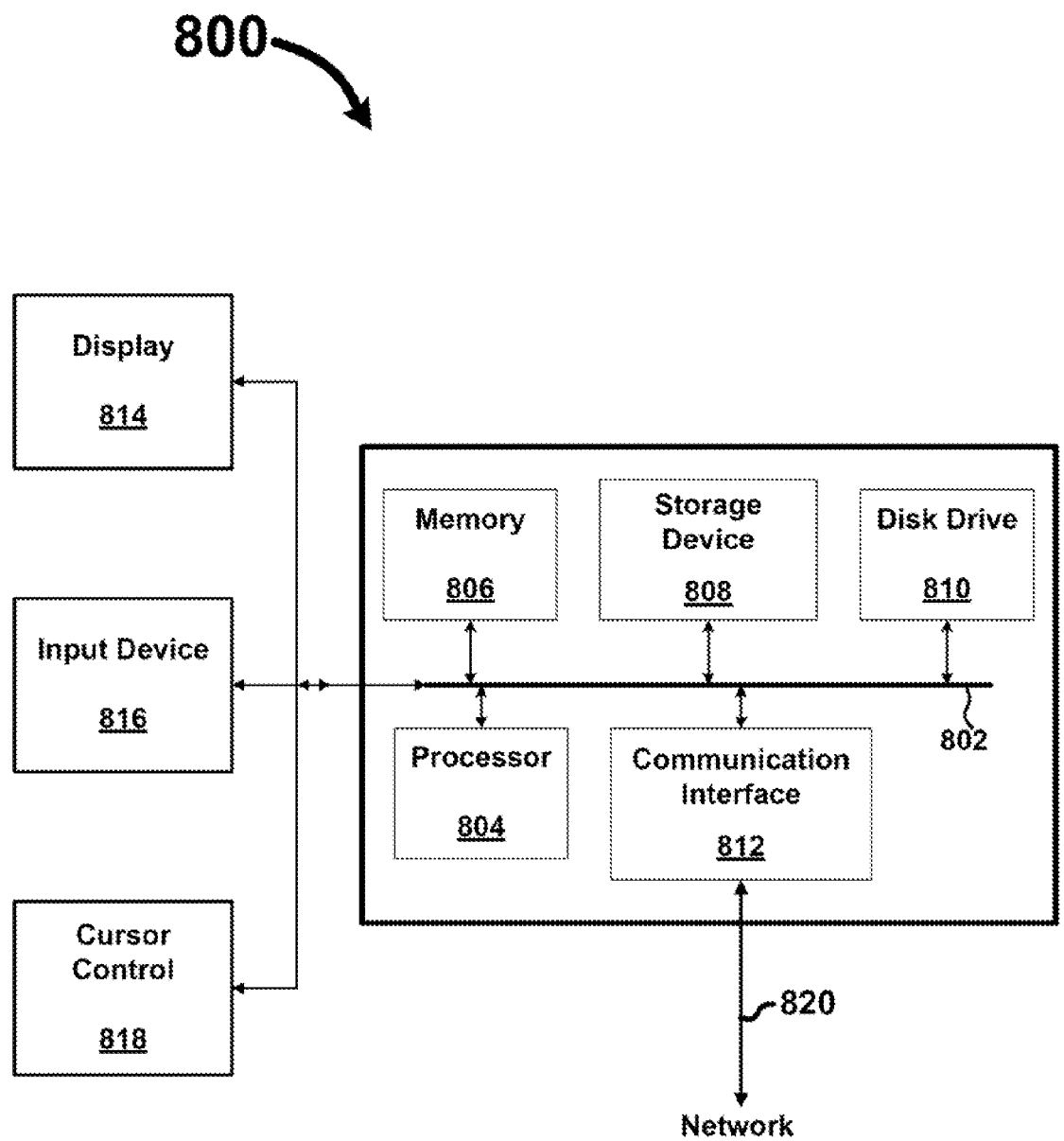
FIG. 8 depicts a block diagram of an exemplary computer system suitable for real time execution of intelligent content aware caching of virtual machine data by relevance to the NTFS file system, according to various embodiments.

FIG. 8 illustrates an exemplary computer system suitable for real time execution of intelligent content aware caching of virtual machine data by relevance to the NTFS file system. In some examples, computer system 800 may be used to implement computer programs, applications, methods, processes, or other software to perform the above-described techniques. Computer system 800 includes a bus 802 or other communication mechanism for communicating information, which interconnects subsystems and devices, such as processor 804, system memory 806 (e.g., RAM), storage device 808 (e.g., ROM, Flash Memory, SSD, etc.), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball).

According to some examples, computer system 800 performs specific operations by processor 804 executing one or more sequences of one or more instructions stored in system memory 806. Such instructions may be read into system memory 806 from another computer readable medium, such as static storage device 808 or disk drive 810. In some examples, disk drive 810 can be implemented using a SSD. In some examples, hard-wired circuitry may be used in place of or in combination with software instructions for implementation.

The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks, such as disk drive 810. Volatile media includes dynamic memory, such as system memory 806. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 502 for transmitting a computer data signal.

In some examples, execution of the sequences of instructions may be performed by a single computer system 800. According to some examples, two or more computer systems 800 coupled by communication link 820 (e.g., LAN, PSTN, or wireless network) may perform the sequence of instructions in coordination with one another. Computer system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution. Single computer system 800 may be replicated, duplicated, or otherwise modified to service the needs of a real time intelligent content aware caching of virtual machine data by relevance to the NTFS file system in a virtualized desktop environment as described herein.

Figure 9:
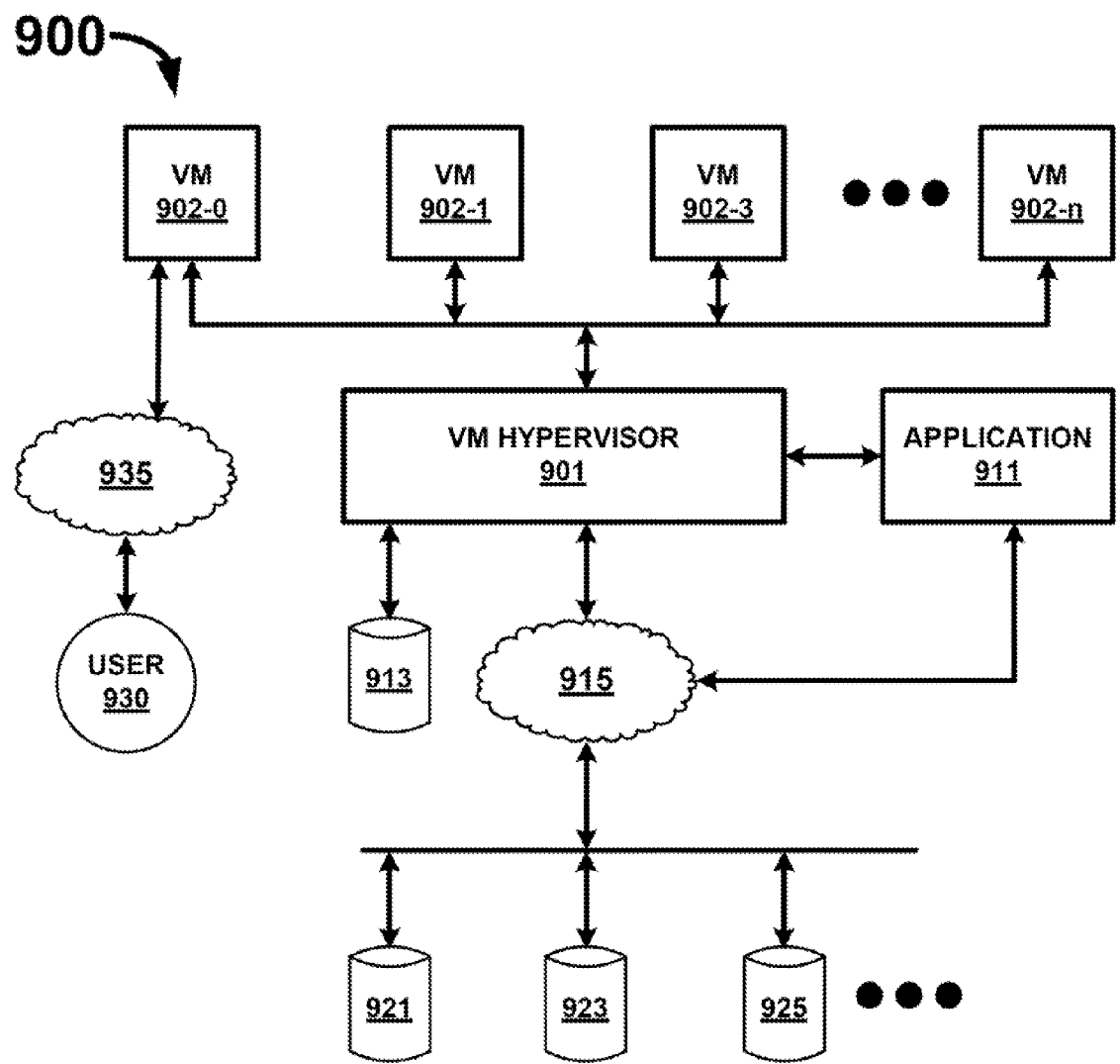
FIG. 9 depicts an exemplary system for real time of intelligent content aware caching of virtual machine data by relevance to the NTFS file system, according to various embodiments.

FIG. 9 depicts an exemplary system for real time intelligent content aware caching of virtual machine data by relevance to the NTFS file system in a virtualized desktop environment. Here, system 900 includes virtual machines (hereafter "VM"s) 902-0-902-n, a VM hypervisor 901, intelligent content aware caching application 911, optional DAS storage 913, primary storage 921-925, storage network 915, user 930, and network 935. The number, type, configuration, topology, connections, or other aspects of system 900 may be varied and are not limited to the examples shown and described. In some examples, 902-0-902-n may be instances of an operating system running on various types of hardware, software, circuitry, or a combination thereof (e.g., x86 servers) that are managed by VM hypervisor 901. As shown, application 911 may be used to implement intelligent content aware caching using a cache memory (e.g., cache 600) into which data may be read or written before being asynchronously (or, in some examples, synchronously) written back to primary storage 921-925. The cache memory may be local to VM hypervisor 901, DAS 913, or elsewhere in system 900. Further, primary storage 921-925 may be implemented as any type of data storage facility such as those described herein (e.g., SAN, NAS, RAID, DAS, disk drives, and others, without limitation). Some or all of the components of system 900 depicted in FIG. 9 can be implemented using at least a portion of the system 800 depicted in FIG. 8.

The foregoing description, for purposes of explanation, uses specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention. Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
   using an assigned value from a catalog to determine which slot to evict from a set in a cache, the assigned value is an integer;
   evaluating a slot from the set in the cache using an intelligent content aware caching application running on a virtual machine (VM) hypervisor, the intelligent content aware caching application configured to read contents of the catalog to determine whether or not to evict the slot being evaluated;
   determining when metadata for the slot being evaluated has an assigned value of three and foregoing eviction of the slot being evaluated when its metadata has the assigned value of three;
   (a) evaluating all slots in the set having an assigned value of zero and evicting a slot having an oldest time stamp and having the assigned value of zero in its metadata;
   (b) evaluating all slots in the set having an assigned value of two and evicting a slot having an oldest time stamp and having the assigned value of two in its metadata;
   (c) evaluating all slots in the set having an assigned value of one and evicting a slot having an oldest time stamp and having the assigned value of one in its metadata; and
   evaluating slots in a second set in the cache after at least one slot in the set that was found to have an assigned value of zero, two, or one in its metadata has been evicted, or when no slots in the set were found that have assigned values of zero, two, or one in their metadata.

2. The method of claim 1, wherein the evaluating of all slots occurs in an order and the order is (a) followed by (b), and (b) followed by (c).

3. The method of claim 1 and further comprising:
   evaluating the next slot in the set.

4. The method of claim 1 and further comprising:
   going to another set in the cache and evaluating slots in the another set.

5. A non-transitory computer readable storage medium including instructions that, when executed on a computer system cause the computer system to perform a method comprising:
   using an assigned value from a catalog to determine which slot to evict from a set in a cache, the assigned value is an integer;
   evaluating a slot from the set in the cache using an intelligent content aware caching application running on a virtual machine (VM) hypervisor, the intelligent content aware caching application configured to read contents of the catalog to determine whether or not to evict the slot being evaluated;
   determining when metadata for the slot being evaluated has an assigned value of three and foregoing eviction of the slot being evaluated when its metadata has the assigned value of three;
   (a) evaluating all slots in the set having an assigned value of zero and evicting a slot having an oldest time stamp and having the assigned value of zero in its metadata;
   (b) evaluating all slots in the set having an assigned value of two and evicting a slot having an oldest time stamp and having the assigned value of two in its metadata;
   (c) evaluating all slots in the set having an assigned value of one and evicting a slot having an oldest time stamp and having the assigned value of one in its metadata; and
   evaluating slots in a second set in the cache after at least one slot in the set that was found to have an assigned value of zero, two, or one in its metadata has been evicted, or when no slots in the set were found that have assigned values of zero, two, or one in their metadata.

6. The non-transitory computer readable storage medium of claim 5, wherein all slots are executed in an order and the order is (a) followed by (b), and (b) followed by (c).

7. The non-transitory computer readable storage medium of claim 5 further comprises:
   evaluating the next slot in the set.

8. The non-transitory computer readable storage medium of claim 5 further comprises:
   going to another set in the cache and evaluating slots in the another set.

9. A system, comprising:
   a memory to store a catalog; and
   a processor coupled with the memory to execute an intelligent content aware caching application to
      use an assigned value from a catalog to determine which slot to evict from a set in a cache, the assigned value is an integer,
      evaluate a slot from the set in the cache using an intelligent content aware caching application running on a virtual machine (VM) hypervisor, the intelligent content aware caching application configured to read contents of the catalog to determine whether or not to evict the slot being evaluated,
      determine when metadata for the slot being evaluated has an assigned value of three and foregoing eviction of the slot being evaluated when its metadata has the assigned value of three
      (a) evaluate all slots in the set having an assigned value of zero and evicting a slot having an oldest time stamp and having the assigned value of zero in its metadata;
      (b) evaluate all slots in the set having an assigned value of two and evicting a slot having an oldest time stamp and having the assigned value of two in its metadata;
      (c) evaluate all slots in the set having an assigned value of one and evicting a slot having an oldest time stamp and having the assigned value of one in its metadata; and
      evaluate slots in a second set in the cache after at least one slot in the set that was found to have an assigned value of zero, two, or one in its metadata has been evicted, or when no slots in the set were found that have assigned values of zero, two, or one in their metadata.

10. The system of claim 9, wherein all slots are executed in an order and the order is (a) followed by (b), and (b) followed by (c).

11. The system of claim 9, further comprises the processor to evaluate the next slot in the set.

12. The system of claim 9, further comprises the processor to go to another set in the cache and evaluate slots in the another set.

* * * * *